United States Patent [19]
Sakakibara

[11] 4,446,940
[45] May 8, 1984

[54] SPEED CONTROL SYSTEM FOR MOTOR VEHICLE EQUIPPED WITH TURBOCHARGER

[75] Inventor: Naoji Sakakibara, Chiryu, Japan

[73] Assignee: Aisin Seiki Kabushiki Kaisha, Kariya, Japan

[21] Appl. No.: 258,032

[22] Filed: Apr. 27, 1981

[30] Foreign Application Priority Data

May 23, 1980 [JP] Japan .................................. 55-68764

[51] Int. Cl.³ ...................... F02B 67/00; B60K 31/00
[52] U.S. Cl. ..................................... 180/177; 60/598; 123/383; 123/559
[58] Field of Search ............... 180/177, 176, 175, 178, 180/179, 170, 171, 172, 173, 174; 123/360, 383, 353, 559, 565; 60/601, 611, 605, 598

[56] References Cited

U.S. PATENT DOCUMENTS 2,858,821 11/1958 Isley ................................ 123/383 X
3,049,865 8/1962 Drayer .................................... 60/611
3,418,986 12/1968 Scherenberg ........................ 123/559
3,541,784 11/1970 Haase ..................................... 60/605
4,202,424 5/1980 Sakakibara et al. ................ 180/176
4,227,372 10/1980 Kakimoto et al. .............. 180/178 X
4,232,757 11/1980 Ochiai et al. .................... 180/177 X Primary Examiner—Joseph F. Peters, Jr.

Attorney, Agent, or Firm—Oblon, Fisher, Spivak, McClelland & Maier

[57] ABSTRACT

A speed control system of a motor vehicle for constantly maintaining a selected speed having an internal combustion engine which includes a turbocharger having a compressor wheel and electronically controlled fuel injectors which includes a vacuum actuator provided with a vacuum chamber having a first inlet port for inducting vacuum pressure, a second inlet port for inducting atmospheric air and further including a throttle valve and diaphragm which controls the throttle valve in accordance with vacuum pressure in the vacuum chamber, a member for generating a signal in accordance with the difference between the selected speed of the motor vehicle and actual speed of the motor vehicle, a modulating valve for controlling the first inlet port and the second inlet port by the signal delivered from the signal member to thereby modulate the vacuum pressure within the vacuum chamber, an intake manifold, a first passage communicated with the first inlet port and the intake manifold, a second passage communicated with the first inlet port and an inlet end of the compressor wheel of the turbocharger, a first check valve disposed in the first passage so as to induct vacuum pressure to the first inlet port from the intake manifold and a second check valve disposed in the second passage to induct the vacuum pressure to the first inlet port from the inlet end of the compressor wheel.

3 Claims, 3 Drawing Figures

SPEED CONTROL SYSTEM FOR MOTOR VEHICLE EQUIPPED WITH TURBOCHARGER

BACKGROUND OF THE INVENTION

1. Field of the Invention

The present invention relates to a speed control system for a motor vehicle having an internal combustion engine with electronically controlled fuel injection equipped with a turbocharger and, more particularly, to an improvement in a vacuum actuator controlling a throttle valve to constantly maintain a selected speed of the motor vehicle.

2. Description of the Prior Art

A conventional speed control system for a motor vehicle includes an internal combustion engine with a turbocharger and an electronically controlled fuel injector and is disclosed for example in U.S. Pat. No. 4,227,372 granted on Oct. 14, 1980 to Kakimoto et al.

Such a conventional speed control system merely limits the maximum vehicle speed to a desirable level but provides no controlling of the throttle valve.

It is well known in the art that a compressor wheel in a turbocharger of an internal combustion engine can include electronically controlled fuel injectors disposed between the air cleaner and the throttle valve to pressurize intake air inducted into the intake manifold. As a result, the vacuum pressure caused at the intake manifold is greatly decreased upon the compressor wheel being driven.

Accordingly, a vacuum actuator operated by vacuum pressure generated at the intake manifold cannot control the throttle valve due to shortage of vacuum pressure.

SUMMARY OF THE INVENTION

One of the objects of the present invention is to provide a speed control system to constantly maintain a selected speed of a motor vehicle having an internal combustion engine including a turbocharger and electronically controlled fuel injectors even if the turbocharger is operated.

Another object of the present invention is to provide a speed control system for a motor vehicle which is low in cost and simple in construction.

According to the invention, the vacuum inlet port of the vacuum actuator which controls the throttle valve receives the higher pressure of either the vacuum pressure within the intake manifold or the vacuum pressure within the inlet end of the compressor wheel of the turbocharger.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
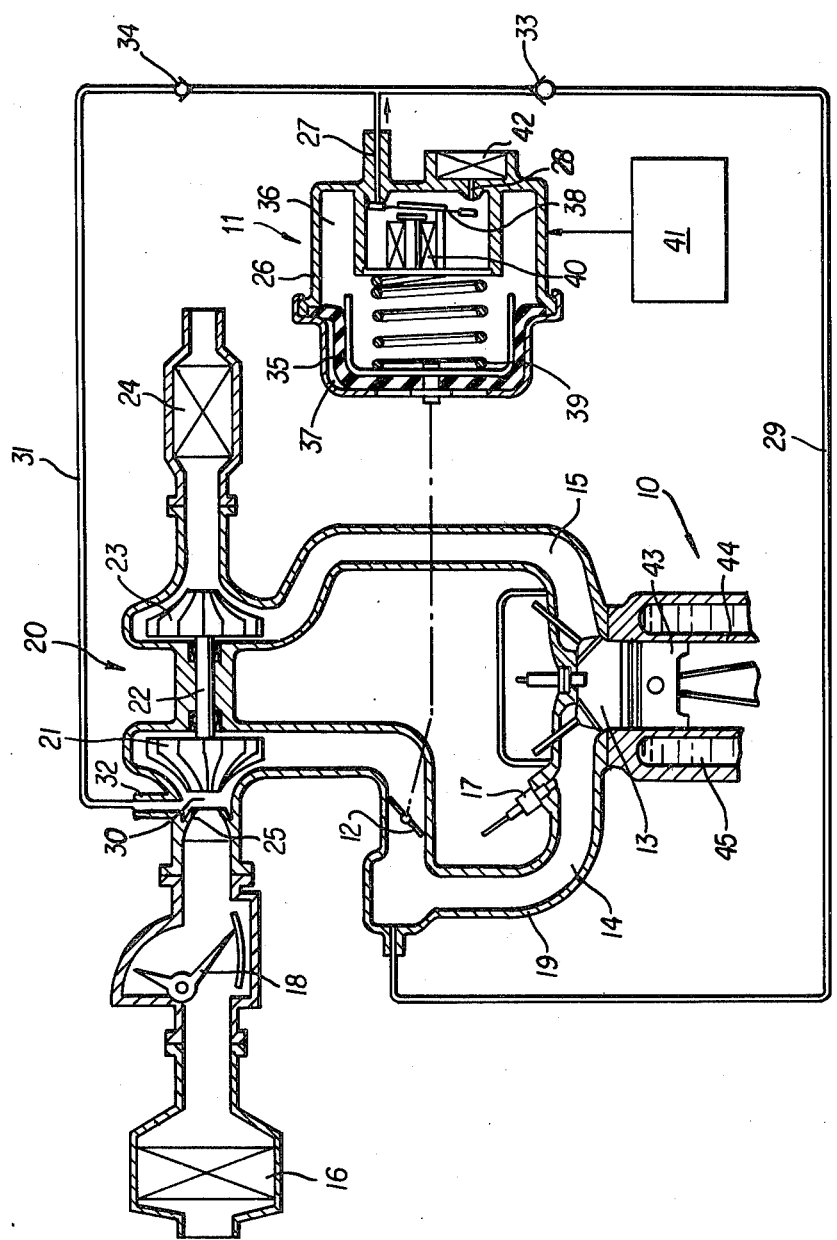
FIG. 1 is a functional diagram of a speed control system for a motor vehicle using a vacuum actuator to constantly maintain a selected vehicle speed according to the present invention.

A speed control system shown in FIG. 1 for a motor vehicle includes an internal combustion engine 10 and a vacuum actuator 11 for controlling throttle valve 12 of the engine 10. A combustion chamber 13 of engine 10 is communicable with an intake passageway 14 and an exhaust gas passageway 15. The intake passageway 14 is provided with an air cleaner 16 for removing dust contained in atmospheric air to be inducted.

Reference numeral 17 represents a fuel injector disposed in the intake passageway 14 to inject fuel into passageway 14. Fuel injector 17 is electronically controlled in accordance with various engine operating parameters, for example, the amount of intake air flow through the intake passageway 14. The amount of intake air is measured by an air flow meter 18 operatively disposed in intake passageway 14. Intake passageway 14 is provided therein with throttle valve 12 for controlling the amount of the intake air supplied to combustion chamber 13 through intake manifold 19 thereof.

Engine 10 is provided with a turbocharger 20 which has a compressor wheel 21 fixedly connected through a common shaft 22 to turbine wheel 23. Compressor wheel 21 is rotatably disposed in intake passageway 14 between air flow meter 18 and throttle valve 12.

Turbine wheel 23 is rotatably disposed in an exhaust gas passageway 15 between combustion chamber 13 and a catalytic converter 24. Turbine wheel 23 is rotated by the pressure of the exhaust gases passing through exhaust passageway 15, and compressor wheel 21 rotates to pressurize air passing through the intake passageway 14. A restriction 25 is disposed in intake passageway 14 between flow meter 18 and compressor wheel 21 to restrict the flow of the intake air.

Vacuum actuator 11 is provided with a casing 26, a first inlet port 27 and a second inlet port 28. First inlet port 27 is communicable with intake manifold 19 passing through a passage 29 and with an inlet end 30 of compressor wheel 21 in the intake passageway 14 which is disposed between restriction 25 and compressor wheel 21 passing through a passage 31.

A pipe 32 is disposed in intake passageway 14 between restriction 25 and compressor wheel 21. The pipe 32 communicates with the passage 31, which is provided with a first check valve 34 for inducting a vacuum pressure generated or caused at the inlet end 30 of compressor wheel 21 to first inlet port 27. Similarly, passage 29 is provided with a second check valve 33 for inducting vacuum pressure generated or caused at intake manifold 19 to first inlet port 27.

Second check valve 33 does not open to allow the vacuum pressure to return to the intake manifold 19 from the first inlet port 27. First check valve 34 similarly does not open to allow the vacuum pressure to return to the inlet end 30 of compressor wheel 21 from the first inlet port 27. Accordingly, the first inlet port 27 receives the higher vacuum pressure between either the vacuum pressure within the intake manifold 19 or the vacuum pressure within the inlet end 30 of compressor wheel 21.

A diaphragm 35 divides a vacuum chamber 36 and an atmospheric chamber 37 within casing 26 of actuator 11. Vacuum chamber 36 is provided with inlet ports 27, 28 and a vacuum pressure modulating valve 38 positioned within the chamber 36.

Diaphragm 35 is operatively connected to the throttle valve 12. A spring 39 biases diaphragm 35 in a direction toward the atmospheric chamber. Modulating valve 38 is provided with a solenoid 40 which receives an electrical signal from a computer 41 to be energized. Upon solenoid 40 being energized, first inlet port 27 is opened and second inlet port is closed by valve 38. Accordingly, modulating valve 38 modulates the vacuum pressure in vacuum chamber 36 in a direction in accordance with the signal from computer 41. Diaphragm 35 controls the direction of opening of throttle valve 12 in accordance with the vacuum pressure in vacuum chamber 36.

The computer 41 produces a signal in accordance with the difference between the selected vehicle speed and the actual vehicle speed under the control condition of motor vehicle speed. An air cleaner 42 removes the dust contained in atmospheric air inducted to the second inlet port 28. Reference numerals 43, 44 and 45 represent a piston, cylinder and a radiator containing the cooling water of engine 10.

The vacuum pressure generated in the intake manifold 19 is enough to operate diaphragm 35 of modulating valve 11 except upon operation of turbocharger 20. When turbocharger 20 is driven, the vacuum pressure caused in intake manifold 19 is reduced to atmospheric pressure because intake air within the intake manifold 19 is compressed by wheel 21. Under this condition, the inlet end 30 of compressor wheel 21 in the intake passageway 14 causes a vacuum pressure in the intake manifold 19 because intake air is drawn into compressor wheel 21. The inducted vacuum pressure in vacuum chamber 36 of vacuum actuator 11 is the higher of either the vacuum pressure within the intake manifold 19 or the vacuum pressure within the inlet end 30 of compressor wheel 21 passing through valves 33 and 34 respectively. Therefore, vacuum actuator 11 continuously maintains the vacuum pressure so as to control throttle valve 12 which controls the selected speed of the motor vehicle, even if the turbocharger 20 is driven. Consequently, the speed control system can control the motor vehicle speed to constantly maintain the selected speed even if the turbocharger 20 is driven.

Figure 2:
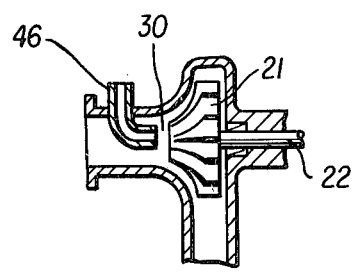
FIG. 2 is a partially sectional view of the structure of the inlet end of a compressor wheel showing a modified embodiment of the present invention.

FIG. 2 shows a modified embodiment relating to the inlet end 30 of the compressor wheel 21 of turbocharger 20. Inlet end 30 of compressor wheel 21 is not provided with the restriction 25. A U-shaped pipe 46 which inducts the vacuum pressure to the passage 31 is positioned at the inlet end 30 of the compressor wheel 21.

Figure 3:
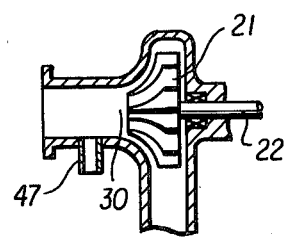
FIG. 3 is a partially sectional view of the structure of the inlet end of the compressor wheel showing a further modified embodiment of the present invention.

FIG. 3 shows a further embodiment relative to the inlet end 30 of compressor wheel 21 of turbocharger 20. Inlet end 30 constitutes an entrance portion of compressor wheel 21 which is not provided with the restriction 25 in a manner similar to that in FIG. 2. A pipe 47 instead inducts vacuum pressure to passage 31.

Obviously, numerous modifications and variations of the present invention are possible in light of the above teachings. It is therefore to be understood that within the scope of the appended claims the invention may be practiced otherwise than as specifically described herein.

I claim:

1. A speed control system for a motor vehicle having an internal combustion engine, a turbocharger, and an intake manifold, said speed control system comprising:
   (a) a throttle valve located in said intake manifold;
   (b) means for generating a signal in accordance with the difference between a selected speed of said motor vehicle and the actual speed of said motor vehicle;
   (c) a vacuum actuator comprising:
      (i) a casing the interior of which is divided into an atmospheric chamber and a vacuum chamber by a diaphragm, said casing having a first inlet port for introducing vacuum into said vacuum chamber and a second inlet port for introducing atmospheric air into said vacuum chamber, and
      (ii) a modulating valve for selectively opening said first inlet port or said second inlet port in response to said signal, thereby modulating the pressure within said vacuum chamber;
   (d) means operatively connecting said diaphragm to said throttle valve such that the opening of said throttle valve is dependent upon the position of said diaphragm;
   (e) a first passage providing communication between said first inlet port and said intake manifold;
   (f) a second passage providing communication between said first inlet port and the inlet end of said turbocharger;
   (g) a first one-way check valve disposed in said first passage such that said first one-way check valve is open when the pressure in said intake manifold is less than the pressure in said first inlet port and closed when the pressure in said first inlet port is less than the pressure in said intake manifold; and
   (h) a second one-way check valve disposed in said second passage such that said second one-way check valve is open when the pressure in the inlet end of said turbocharger is less than the pressure in said first inlet port and closed when the pressure in said first inlet port is less than the pressure in the inlet end of said turbocharger,
   whereby the pressure in said first inlet port is the lower of the pressure in said intake manifold or the pressure in the inlet end of said turbocharger.

2. A speed control system as recited in claim 1 and further comprising a restriction upstream of the inlet end of said turbocharger for restricting air flow to said turbocharger.

3. A speed control system as recited in claim 1 and further comprising a U-shaped pipe which provides communication between said second passage and the inlet end of said turbocharger.

* * * * *